Jan. 25, 1966    F. G. KRAFFT    3,231,320
HYDROSTATIC LUBRICATION
Filed Dec. 28, 1962    2 Sheets-Sheet 1

INVENTOR.
FREDERICK KRAFFT
BY Toulmin & Toulmin
ATTORNEYS

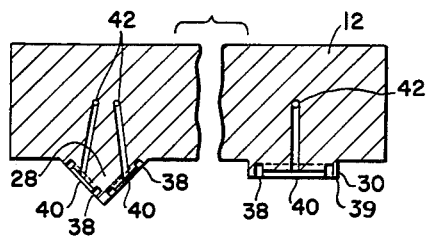
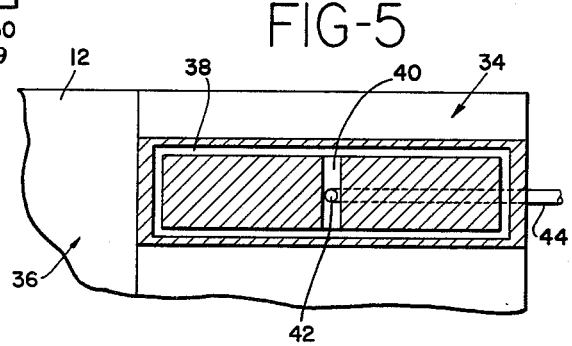
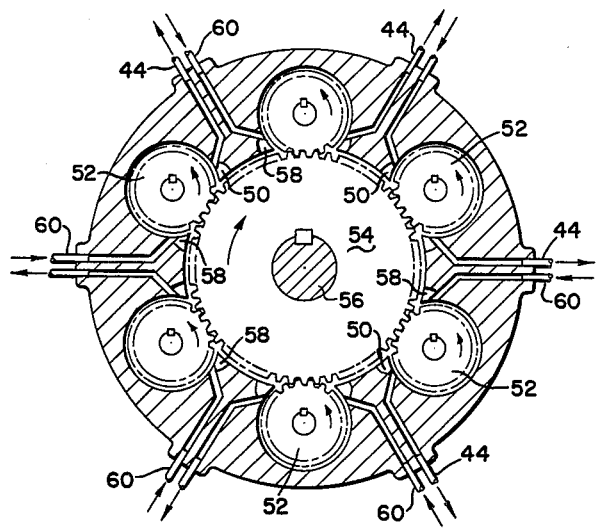
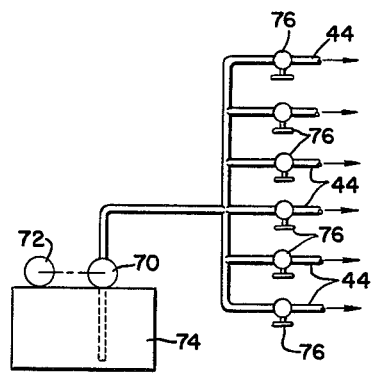

United States Patent Office 3,231,320
Patented Jan. 25, 1966

3,231,320
HYDROSTATIC LUBRICATION
Frederick Gustave Krafft, Springfield, Ohio, assignor to The Thompson Grinder Company, Springfield, Ohio, a corporation of Ohio
Filed Dec. 28, 1962, Ser. No. 248,086
7 Claims. (Cl. 308—5)

This invention relates to a supporting and lubricating arrangement for relatively movable members, such as parts of machine tools and the like.

Most mechanical devices, including machine tools, have parts that are relatively movable and which parts must be guided so that they move relatively along an accurate predetermined path. This is usually accomplished by closely fitting the parts together so that they are guided along machined ways or by gib arrangements and the like which accurately connect the parts together and guide them in their relative movement.

Supporting and guiding structures of the nature referred to are usually adequate for controlling accuracy, but are inherently high friction devices so that many times substantial power is required to effect the relative movement referred to. A particular case in point, and one with which the present invention is particularly concerned, is the supporting of a table on a bed, such as a grinding machine table, or another type of machine tool in which a relatively heavy table or carriage is mounted on smooth ways of a supporting bed for movement thereon.

In structures of this nature, there is often provided one or more flat ways and one or more V ways which are accurately machined and which engage complementary shaped surfaces on the other member. These surfaces are lubricated, usually by cutting oil pockets, in one or both of the surfaces so that the surfaces are lubricated as the members move relatively.

However, the full weight of the movable member or table is exerted on the ways on which it is supported and this not only creates friction that requires a large amount of power to bring about movement of the member, but it also induces wear.

Numerous attempts have been made to establish an oil film between members of this nature so that the movable member is always supported on this fluid film and thereby the effects of friction are overcome both as to the amount of power required to move the member and also with respect to the wear that takes place between the members.

This is readily accomplished by forming a pocket in one or the other of the members and supplying to this pocket fluid under pressure, usually lubricating oil, so that the fluid film that is established between the members has lubricating characteristics. These attempts heretofore have not been particularly successful for the reason that the thickness of the film tended to vary considerably with the amount of load imposed on the moving member so that accuracy of the support for the moving member was inferior to the support that could be had on solid ways lubricated in a conventional manner.

Still further, with an arrangement in which relatively large pockets were provided that were supplied with fluid under pressure, an interruption in the pressure supply would result in the movable member coming down on the supporting surface therefor and, in that case, due to the area cut out for the pocket, the unit stress on the supporting area or areas was increased materially and this would, of course, produce a condition in which extremely high wear and damage could take place.

With the foregoing in mind, the present invention has has as a particular objective, an arrangement whereby a movable member, such as a machine tool table or the like, can be floated on a supporting member, such as a machine tool bed or the like, with a fluid film therebetween and in such a manner that the aforementioned inaccuracies and possibilities of wear and damage are eliminated.

Another object of this invention is the provision of a method and an arrangement for effecting fluid film support of a movable member without materially reducing the areas of the supporting surfaces for the movable member whereby failure of the pressurized fluid supply for maintaining the film will not lead to an extremely high degree of stress in the supporting surfaces.

Still, another object of this invention is the provision of a system for effecting fluid film support of a movable member on a supporting member such that the supporting film between the members is maintained substantially constant in thickness regardless of the load conditions on the movable member.

These and other objects and advantages of this invention will become more apparent upon reference to the following specification, taken in connection with the accompanying drawings, in which:

FIGURE 4 is a transverse cross-sectional view indicated by line 4—4 on FIGURE 3 and partly broken away showing the pressurized film retaining regions for the flatway for one side of the bed and the V way on the other side thereof;

FIGURE 5 is a sectional view indicated by line 5—5 on FIGURE 2 showing the passage means associated with one of the pressurized film maintaining areas of the flatway of the table;

FIGURE 6 is a sectional view showing one form that a source of fluid pressure for the several areas could take, the particular form illustrated in FIGURE 6 comprising a unitized multiple gear pump; and FIGURE 7 is a more or less diagrammatic view showing how a single pump could supply the several areas through multiple restrictors so that substantially constant supplies to each of the individual pressurized film regions could be maintained substantially independently of the others thereof.

Figure 1:
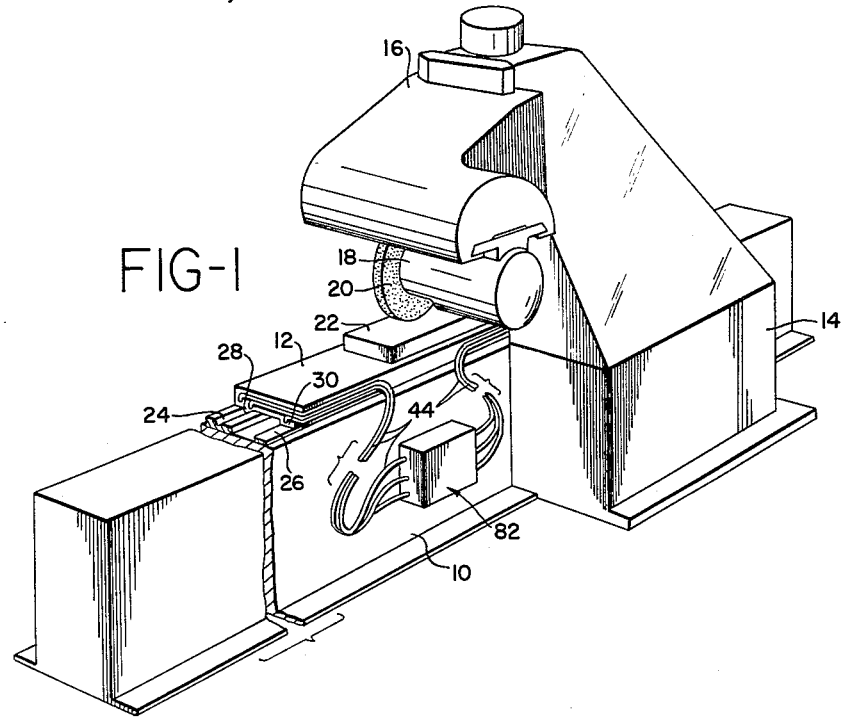
FIGURE 1 is a perspective view of a grinding machine having a reciprocatory table supported on a stationary bed in accordance with the teachings of the present invention.

Referring to the drawings somewhat more in detail, FIGURE 1 shows, rather diagrammatically, a grinding machine having a bed 10, a table 12, reciprocable on the bed, a column 14 mounted adjacent the bed or attached to one side of the bed, a saddle 16 vertically reciprocable on the column, and a wheel head 18 which is laterally reciprocable in the saddle so that the grinding wheel 20 carried thereby can be positioned laterally of workpiece 22 on the table so as to carry out a desired grinding operation.

Formed on the upper portion of bed 10 is a V way 24 and a flatway 26. Engaging these ways is a complementary shaped V way 28 on the table and a flatway 30. It will be understood that the particular way arrangement illustrated is merely exemplary and that many different arrangements of ways or guiding surfaces could be utilized within the purview of the present invention.

Figure 2:
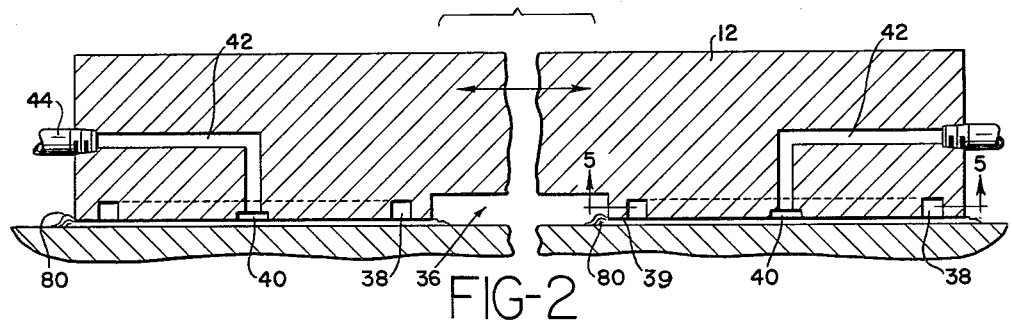
FIGURE 2 is a longitudinal section, partly broken away, taken through the table and the uppermost portion of one of the supporting ways of the bed showing the region in which the supporting fluid film according to the present invention is maintained.
Figure 3:
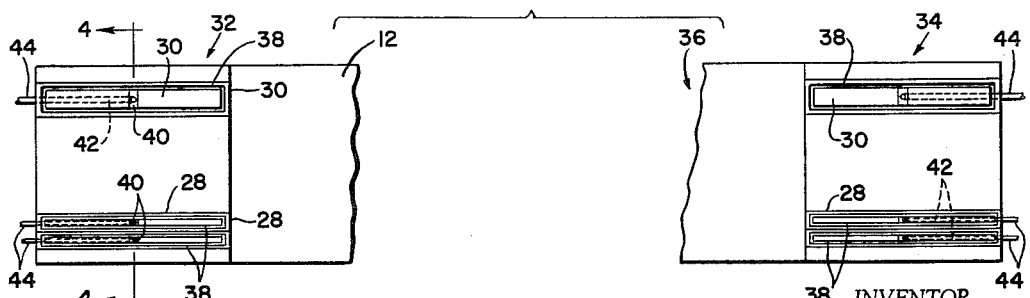
FIGURE 3 is a view looking up from beneath the movable table and partly broken away and showing the supporting regions on the bottom of the table where the pressurized films are maintained.

Reference to FIGURES 2 and 3 will reveal that the way surfaces 28 and 30 on the underneath side of the reciprocatory table 12 are interrupted so that there is a region 32 at one end of the bed and a region 34 at the other end of the bed that contains the ways while the region 36 intermediate these portions is interrupted. It will be understood at this point that there could be more than the two spaced regions 32 and 34 if desired, this being dependent on the length of the table. For a longer table, more than these two spaced regions could be provided. Normally, a relatively short distance will separate the regions so there is not a long unsupported length of table therebetween.

Each way region is provided with means for maintaining a predetermined area thereof under pressure. This is accomplished, however, without forming a large pocket in the way area as has heretofore been done with arrangements of this nature. Instead, each individual way surface including the flatway and the opposite faces of the V way is provided with a groove 38 which, together with the surrounding border 39, defines a region of the way, in the particular arrangement shown, a rectangular region.

This groove means 38 is supplied with fluid under pressure delivered to a transverse groove 40 by way of passage means 42 formed in the table and to each of which passage means 42 there is connected an individual conduit 44.

Each of the several areas which is limited by the outermost edge of the confining border area 39 is maintained under constant pressure conditions by the supply of lubricating fluid to the groove means 38 thereof under pressure from conduit 44. The lubricating fluid so supplied to groove 38 will flow out laterally from groove 38 between the surrounding border area 39 and the way surface of bed 10 adjacent thereto. This fluid will then be collected on the bed and returned to a collection point from where it is again pumped into conduits 44.

It will be obvious that the entire region inwardly of the outer edge of groove 38 is maintained under constant pressure. From the outer edge of groove 38 to the outer edge of the border area 39 surrounding the groove, the pressure will fall along a substantially straight line gradient from the predetermined pressure supplied by conduit 44 to atmospheric pressure. It will be noted that substantially the entire way surface on the table is flat and parallel to the way surface on the bed, the table way surface being interrupted only by the groove means 38 and 40.

Thus, should there be a failure in the supply of pressurized fluid to the groove means 38 and 40, there is adequate way area to provide support for the table without there being developed in the area stresses any higher than can be allowed in order to avoid damage to the way surfaces.

With reference to the supply of pressure fluid to the pressurized regions, it is important that this supply be substantially constant so that the thickness of the film maintained within the pressurized areas will be substantially constant under all conditions thereby to provide for a high degree of accuracy of support for the table 12.

A preferred way of accomplishing this is illustrated in FIGURE 6 which shows a multiple gear pump which has as many outlets as there are conduits 44 leading to table 12. Each of these conduits 44 is connected with the discharge region 50 of a gear pump comprising a small gear 52 individual to that particular discharge region and a larger center gear 54 mounted on and driven by a drive shaft 56.

Each individual gear 52 also has a suction region 58 to which is connected a suction conduit 60 and all of which suction conduits 60 lead to a single source of supply.

The pump illustrated in FIGURE 6 will thus supply fluid under pressure at a constant rate to all of the individual pressurized regions beneath the table 12 and this rate of supply will be substantially constant regardless of the load conditions on the table, so that the fluid films maintained between the table and the bed will remain at a constant thickness at all times and the table will, therefore, be accurately supported on the bed.

As an alternative to the multiple gear pump of FIGURE 6, the arrangement of FIGURE 7 can many times be used. In FIGURE 7, there is a single pump 70 driven by a motor 72 and arranged to draw fluid from a reservoir 74, pump 70 discharges through a plurality of needle valves 76 to the conduits 44. The amount of fluid required for the individual pressurized areas is relatively small and the needle valve 76 can, therefore, be arranged to provide for a high degree of friction and thus, if one of the conduits 44 breaks or becomes stopped up, the rate of supply to each of the other conduits 44 will remain practically unchanged. The FIGURE 7 circuit will also maintain a substantially constant thickness of oil film on each pressurized area regardless of the conditions that exist at any other of the pressurized areas.

An advantage that obtains in connection with the interrupting of the way surfaces on the bottom of the table is illustrated in FIGURE 2. When the table reciprocates on the bed, there is a build up of oil at the leading edge of each way surface. This build up is indicated at 80 at the left end of each of the way surfaces illustrated in FIGURE 2.

The tendency is for this oil to establish a wedge under the way surface that tends to lift the table upwardly. With a continuous way surface on the bottom of the table, the table will tilt upwardly a small amount at its leading end. With the way surfaces interrupted as illustrated, however, the same lifting effect will take place at the leading edge of each pressurized area along the bed and the table will, therefore, lift in parallelism with itself rather than tilting upwardly at the leading end.

This, of course, is a distinct advantage in maintaining the ground surface in absolute parallelism with a desired reference plane. The same beneficial effect obtains where the bed is provided with a plurality of the pressurized regions distributed along the length thereof as well as when the bed has only two pressurized regions at opposite ends thereof as illustrated.

It has been discovered that a table supported in the manner illustrated is supported in a substantially completely friction free manner and the power requirements for reciprocating the table are thus more or less reduced over what is necessary with the ordinary lubricated way arrangement. The table is completely supported on the fluid film and the friction is reduced to a point that substantially the only power required for actuating the table is that necessary to effect acceleration thereof at the beginning of its travel in one direction and the force necessary to overcome the load imposed on the table through the workpiece by the cutting tool operating the workpiece.

The pressure fluid supply, consisting of the system of FIGURE 6 or that of FIGURE 7, can be mounted on the table or it can be mounted on the bed as indicated, for example, at 82 in FIGURE 1. The connections are made from this unit to the points of connection thereof on the table. These connections consisting of conduits 42 can be relatively small flexible plastic tubes, ray one-eighth to three-sixteenths of an inch outside diameter.

When the unit is carried on the table, the connection can be rigid.

The groove means in the ways forming the means confining the pressurized areas may be as small as one-sixteenth to one-eighteenth of an inch in radius and it will be apparent that this forms only a minute interruption in the way surface.

With regard to pressures that might be involved, considering a table for a grinding machine, which table might weigh as much as twelve hundred pounds, if there are two pressurized areas on the flat way and two pressurized areas on each side of the V way, and assuming further that the projected area of a pair of the pressurized areas on the V way is equal to the area of the pressurized area on the flatway, and that each of these areas is about twenty square inches, the total projected area will then be eighty square inches and there will be required a pressure of about fifteen pounds per square inch to be maintained over the pressurized areas.

This pressure, of course, is quite low and can easily be maintained by a small gear pump driven by a small motor and, furthermore, the pressure is so small that it could be increased substantially as might be brought about by additional loading on the table without materially affecting the rate of output of the pump supplying the pressure. Because of this, it can be depended upon that the film being maintained between the way surfaces, and which film will be on the order of from four to ten-thousandths of an inch in thickness, will be maintained substantially continuously under all conditions of operation.

The table floats on the oil film as a boat floats in water and is as freely movable, substantially the only resistance being inertial.

While the pressurized areas have been shown on the table, it will be understood that these areas could be on the bed and the same results would be had.

It will be understood that this invention is susceptible to modification in order to adapt it to different usages and conditions, and accordingly, it is desired to comprehend such modifications within this invention as may fall within the scope of the appended claims.

I claim:

1. In combination; a support member, a movable member movably resting on the support member, interengaging parallel way surfaces on said members providing slidable support for said movable member, one of each of said respective interengaging way surfaces being interrupted to form at least two discrete way surface portions spaced along the respective member, groove means in each said portion extending in a closed path along a line spaced inwardly from the outer edge of the respective said portion, the region inside said groove means being coplanar with the respective way portion, said groove means in area comprising only a small fraction of the total area of the respective way portion, and a respective constant delivery source of hydraulic fluid connected to each said groove to maintain a constant thickness film of the said hydraulic fluid between the pertaining way surface portion and the way surface on the other member which it engages.

2. In combination; a support member, a movable member movably resting on the support member, interengaging parallel way surfaces on said members providing slidable support for said movable member, one of each of said respective interengaging way surfaces being interrupted to form at least two discrete way surface portions spaced along the respective member, groove means in each said portion extending in a closed path along a line spaced inwardly from the outer edge of the respective said portion, the region inside said groove means being coplanar with the respective way portion, said groove means in area comprising only a small fraction of the total area of the respective way portion and a respective constant delivery source of fluid connected to each said groove to maintain a constant thickness film of fluid between the pertaining way surface portion and the way surface on the other member which it engages, each said way surface portion being parallel to the way surface on the other member which it engages and being uninterrupted except for said groove means.

3. In combination; a support member, a movable member movably resting on the support member, interengaging parallel way surfaces on said members providing slidable support for said movable member, one of each of said respective interengaging way surfaces being interrupted to form at least two discrete way surface portions spaced along the respective member, groove means in each said portion extending in a closed path along a line spaced inwardly from the outer edge of the respective said portion, the region inside said groove means being coplanar with the respective way portion, said groove means in area comprising only a small fraction of the total area of the respective way portion, and a respective constant delivery source of fluid connected to each said groove to maintain a constant thickness film of hydraulic fluid between the pertaining way surface portion and the way surface on the other member which it engages, said constant delivery source of hydraulic fluid comprising an individual gear pump connected to each groove means.

4. In combination; a support member, a movable member movably resting on the support member, interengaging parallel way surfaces on said members providing slidable support for said movable member, one of each of said respective interengaging way surfaces being interrupted to form at least two discrete way surface portions spaced along the respective member, groove means in each said portion extending in a closed path along a line spaced inwardly from the outer edge of the respective said portion, the region inside said groove means being coplanar with the respective way portion, said groove means in area comprising only a small fraction of the total area of the respective way portion, and a respective constant delivery source of hydraulic fluid connected to each said groove to maintain a constant thickness film of hydraulic fluid between the pertaining way surface portion and the way surface on the other member which it engages, said constant delivery source of hydraulic fluid comprising a gear unit having a single central gear and a plurality of smaller gears meshing therewith at spaced points thereabout to form a plurality of synchronized substantially identical gear pump-like elements, each said gear pump-like element having a fluid inlet and a fluid outlet and having its outlet connected to a selected one of said groove means.

5. In combination; a support member, a movable member movably resting on the support member, interengaging parallel way surfaces on said members providing slidable support for said movable member, one of each of said respective interengaging way surfaces being interrupted to form at least two discrete way surface portions spaced along the respective member, groove means in each said portion extending in a closed path along a line spaced inwardly from the outer edge of the respective said portion, the region inside said groove means being coplanar with the respective way portion, said groove means in area comprising only a small fraction of the total area of the respective way portion, and a respective constant delivery source of hydraulic fluid connected to each said groove to maintain a constant thickness film of hydraulic fluid between the pertaining way surface portion and the way surface on the other member which it engages, said constant delivery source of fluid comprising a pump, a conduit leading from the discharge side of the pump to each said groove means, and needle valve in each said conduit.

6. In combination; a bed having horizontal way surfaces on the top, a table having horizontal way surfaces on the bottom engaging the way surfaces on the bed for reciprocably supporting the table on the bed, the way surfaces on the table being interrupted longitudinally of the table to form at least two spaced rectangular portions, groove means in each said portion extending along a line spaced inwardly a short distance from the outer edge of the respective portion whereby the major part of the area of each portion is disposed inside said groove means, each groove means representing only a small fraction of the total area of the respective way portion, and a plurality of substantially identical constant delivery sources of lubricating liquid, one of said sources being connected to each said groove means to maintain a constant thickness of film of the said way lubricating liquid between each said portion and the corresponding way surface on the bed.

7. In combination; a bed having horizontal way surfaces on the top, a table having horizontal way surfaces on the bottom engaging the way surfaces on the bed for reciprocably supporting the table on the bed, the way surfaces on the table being interrupted longitudinally of the table to form at least two spaced rectangular portions, groove means in each said portion extending along a line spaced inwardly a short distance from the outer edge of the respective portion whereby the major part of the area of each portion is disposed inside said groove means, each groove means representing only a small fraction of the total area of the respective way portion, and a plurality of substantially identical constant delivery sources of lubricating liquid, one of said sources being connected to each said groove means to maintain a constant thickness of film of the said lubricating liquid between each said way portion and the corresponding way surface on the bed, said groove means being substantially identical with each other distance inwardly from the edge of the respective way surface portion to provide substantially identical conditions for the escape of liquid from each of said groove means.

References Cited by the Examiner

UNITED STATES PATENTS

| | | | |
|---|---|---|---|
| 2,062,250 | 11/1936 | Moller | 184—7 |
| 2,411,391 | 11/1946 | Robaczynski | 308—5 |
| 2,710,234 | 6/1955 | Hansen | 308—9 |
| 3,053,583 | 9/1962 | Shaw | 308—9 |

FOREIGN PATENTS

| | | |
|---|---|---|
| 761,425 | 11/1956 | Great Britain. |
| 331,637 | 9/1958 | Switzerland. |

DON A. WAITE, *Primary Examiner.*

FRANK SUSKO, *Examiner.*